(12) United States Patent
Parks et al.

(10) Patent No.: US 11,148,481 B2
(45) Date of Patent: Oct. 19, 2021

(54) PORTABLE ROADSIDE ASSISTANT SYSTEMS

(71) Applicants: Patricia Parks, El Paso, TX (US); Nathan Parks, El Paso, TX (US)

(72) Inventors: Patricia Parks, El Paso, TX (US); Nathan Parks, El Paso, TX (US)

( * ) Notice: Subject to any disclaimer, the term of this patent is extended or adjusted under 35 U.S.C. 154(b) by 324 days.

(21) Appl. No.: 16/532,430

(22) Filed: Aug. 5, 2019

(65) Prior Publication Data

US 2020/0039304 A1 Feb. 6, 2020

Related U.S. Application Data

(60) Provisional application No. 62/714,585, filed on Aug. 3, 2018.

(51) Int. Cl.
*B60C 25/05* (2006.01)
*B60C 25/138* (2006.01)

(52) U.S. Cl.
CPC ...... *B60C 25/0515* (2013.01); *B60C 25/0548* (2013.01); *B60C 25/138* (2013.01); *B60B 2340/50* (2013.01); *B60B 2900/531* (2013.01)

(58) Field of Classification Search
CPC .............. B60B 31/005; B60B 2340/50; B60B 2900/531; B60C 25/00; B60C 25/01; B60C 25/05; B60C 25/0515; B60C 25/0548; B60C 25/138; B23P 19/06; B23P 19/065; B23P 19/069
See application file for complete search history.

(56) References Cited

U.S. PATENT DOCUMENTS

| | | | |
|---|---|---|---|
| 5,125,298 A * | 6/1992 | Smith | B23P 19/006 29/798 |
| 6,305,245 B1 | 10/2001 | Kress | |
| 6,668,685 B2 * | 12/2003 | Boston | B23P 19/069 81/57.22 |
| 7,343,955 B2 | 3/2008 | Cunningham | |
| 10,207,538 B2 * | 2/2019 | Black | B25B 23/18 |

\* cited by examiner

*Primary Examiner* — Robert J Scruggs
(74) *Attorney, Agent, or Firm* — Runyan Law; Charles Runyan (57) ABSTRACT

A portable roadside assistant device; a system which includes a tool designed to ease the process of removing and changing a tire for any user. The present invention is superior to other systems in that it effectively automatically loosens and tightens lug nuts to assist users in changing a flat tire.

20 Claims, 8 Drawing Sheets

PORTABLE ROADSIDE ASSISTANT SYSTEMS

CROSS REFERENCE TO RELATED APPLICATION

The present application is related to and claims priority to U.S. Provisional Patent Application No. 62/714,585 filed 2018 Aug. 3, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of tools and more specifically relates to tire removing and changing tools.

2. Description of Related Art

There are many individuals who are not able to change a tire on their vehicle in the event of a flat. The process is laborious and time consuming and it can be difficult for many. Loosening and tightening the lug nuts is often the most strenuous part of the process. Changing a flat tire on the side of the road for a prolonged period can put the individual at risk for being hit by an oncoming vehicle. A lug wrench is the name for a type of socket wrench used to loosen and tighten lug nuts on automobile wheels. Lug wrenches may be L-shaped, or X-shaped. The form commonly found in car trunks is an L-shaped metal rod with a socket wrench on the bent end and a prying tip on the other end. The prying tip is mainly intended to remove hub caps or wheel covers that may be covering a wheel's lug nuts. Many individuals find the use of conventional lug wrenches to remove a wheel very difficult. An effective alternative is needed.

Prior attempts have been made to address the above-noted problems. For example, U.S. Pub. No. 2002/0117027 to Boston relates to a multi-lug socket tool. The described multi-lug socket tool includes a device for simultaneously removing all of the lug nuts on a vehicle's wheel, thereby reducing the amount of time required to remove the wheel from the vehicle. The device has multiple sockets that fit over each lug nut. Each socket is turned by a lug gear and all of the lug gears are turned by a single central gear. The central gear has a hole or slot in its center for receiving a hand tool or power tool that provides the rotational force. The lug gears are positioned around the circumference of the central gear and the teeth of the lug gears engage with teeth of the central gear. An outer ring gear surrounds all of the lug gears providing an inward pressure that maintains the connection between the teeth of the lug gears and the central gear. When the central gear is rotated each of the lug gears rotate in an opposite direction thereby allowing each lug nut to be turned simultaneously. The device can be mounted on a dolly to aid in movement and the dolly may include a jack for raising and lowering the device to desired height. Unfortunately, the Boston apparatus fails to provide automatic operation, relying entirely on manual operation by the user.

BRIEF SUMMARY OF THE INVENTION

In view of the foregoing disadvantages inherent in the known tools art, the present disclosure provides a novel portable roadside assistant systems. The general purpose of the present disclosure, which will be described subsequently in greater detail, is to provide a tool designed to ease the process of removing and changing a tire for any user. The present device is superior to other systems in that it effectively automatically loosens and tightens lug nuts to assist users in changing a flat tire.

A portable roadside assistant device for assisting removal and installation of lug nuts securing a vehicle wheel to a vehicle is disclosed herein. The portable roadside assistant device includes a plurality of sockets configured to engage the lug nuts during the removal and installation; a sensor configured to sense the locations of the lug nuts relative to the vehicle wheel; a socket aligner configured to align the plurality of sockets in operable positions with respect to the lug nuts; a socket advancer configured to advance the plurality of sockets to positions of simultaneous engagement with the lug nuts; a motor-driven rotator configured to simultaneously rotate the plurality of sockets in clock-wise and counter-clockwise directions; a socket retractor configured to retract the plurality of sockets and the lug nuts away from the vehicle wheel to permit removal and replacement of the vehicle wheel; an automatic controller configured to automatically control the operation of the sensor, the socket aligner, the socket advancer, the motor-driven rotator, and the socket retractor; a power supply adapted to power the sensor, the socket aligner, the socket advancer, the motor-driven rotator, the socket retractor, and the automatic controller; and a portable housing adapted to portably house the power supply, the sensor, the socket aligner, the socket advancer, the motor-driven rotator, the socket retractor, and the automatic controller.

A method of using the portable roadside assistant device is also disclosed herein. The method of using portable roadside assistant device may comprise the steps of: providing the portable roadside assistant device having a sensor configured to sense the locations of the lug nuts relative to the vehicle wheel, a socket aligner configured to align the plurality of sockets in operable positions with respect to the lug nuts, a socket advancer configured to advance the plurality of sockets to positions of simultaneous engagement with the lug nuts, a motor-driven rotator configured to simultaneously rotate the plurality of sockets in clock-wise and counter-clockwise directions, a socket retractor configured to retract the plurality of sockets and the lug nuts away from the vehicle wheel to permit removal and replacement of the vehicle wheel, an automatic controller configured to automatically control the operation of the sensor, the socket aligner, the socket advancer, the motor-driven rotator, and the socket retractor, a power supply adapted to power the sensor, the socket aligner, the socket advancer, the motor-driven rotator, the socket retractor, and the automatic controller, and a portable housing adapted to portably house the power supply, the sensor, the socket aligner, the socket advancer, the motor-driven rotator, the socket retractor, and the automatic controller, positioning the portable roadside assistant device adjacent to the vehicle wheel, automatically sensing the locations of the lug nuts relative to the vehicle wheel, automatically aligning a plurality of sockets in operable positions with respect to the lug nuts; automatically advancing the plurality of sockets to positions of engagement with the lug nuts; simultaneously rotating the plurality of sockets in a removal direction using a motor-driven rotator, automatically retracting the plurality of sockets and the lug nuts away from the vehicle wheel to permit removal and replacement of the vehicle wheel, automatically advancing the plurality of sockets and the lug nuts toward the vehicle wheel to permit reinstallation of the lug nuts on the vehicle wheel, simultaneously rotating the plurality of sockets in an installation direction using the motor-driven rotator, and automatically retracting the plurality of sockets away from the lug nuts after installation. In addition, the method may include the step of setting a torque force applied to the lug nuts by the plurality of sockets to a pre-determined limit.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a portable roadside assistant systems, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to tools and more particularly to a portable roadside assistant systems as used to improve the use of tire removing and changing tools.

Generally, the personal roadside assistant system ("Personal Roadside Assistant") is an automatic device that aligns itself with the tire to loosen lug nuts and then tighten them once the new tire is in place. The device includes robotic assembly having a push button activator, configured to align itself with a tire on a vehicle and simultaneously remove all of the lug nuts. The robotic assembly further includes an adapter or regulator mechanism for assessing the size of the tire and lugs nuts. The device may additionally include a battery, rechargeable power supply, and connector for allowing a remote hook up to an AC or DC power source. A stationary base is included to ensure that the unit is sturdy on uneven ground. The present invention enables users to change a tire quickly and efficiently to reduce the risk of roadside hazards. Further, this saves users time and energy by eliminating much of the manual labor associated with changing a tire. The present invention affords individuals a universal wrench that fits any size or shape of lug nut. In one embodiment of the present invention, personal roadside assistant system may comprise a tool designed to ease the process of removing and changing a tire for any user. The personal roadside assistant system includes an automatic device that aligns itself with a tire to loosen lug nuts and alternatively tighten them once the new tire is in place. This enables users to change a tire quickly and efficiently to reduce the risk of roadside hazards. The device includes a robotic assembly having a push button activator, configured to align itself with a tire on a vehicle and simultaneously remove all of the lug nuts. The robotic assembly may further include an adapter or regulator mechanism that may be useful for assessing the size of the tire and lugs nuts and then making appropriate adjustments so that the vehicle occupant does not have to exert any force or take any measurements. The device applies a turning force causing multiple lug nut sockets to rotate thereby simultaneously screwing or unscrewing all of the lug nuts attached to the wheel. The system may additionally include a battery, rechargeable power supply, and connector for allowing a remote hook up to an AC or DC power source. In a preferred embodiment, the unit is encased in an aerodynamic aluminum case that is lightweight and approximately 12" in height. A stationary base is included to ensure that unit is sturdy on uneven ground. Arms with a universal lug-nut socket are constructed of steel to be able to withstand the pressure of turning the lug nuts. Additional sockets can be added for wheels with more lug nuts. An emergency light may be included on a top-portion of one of the arms that is functional for low light or night. The device may be activated by a power switch. The present invention affords individuals a robotic universal "wrench" that fits any size or shape of lug nut.

Figure 1:
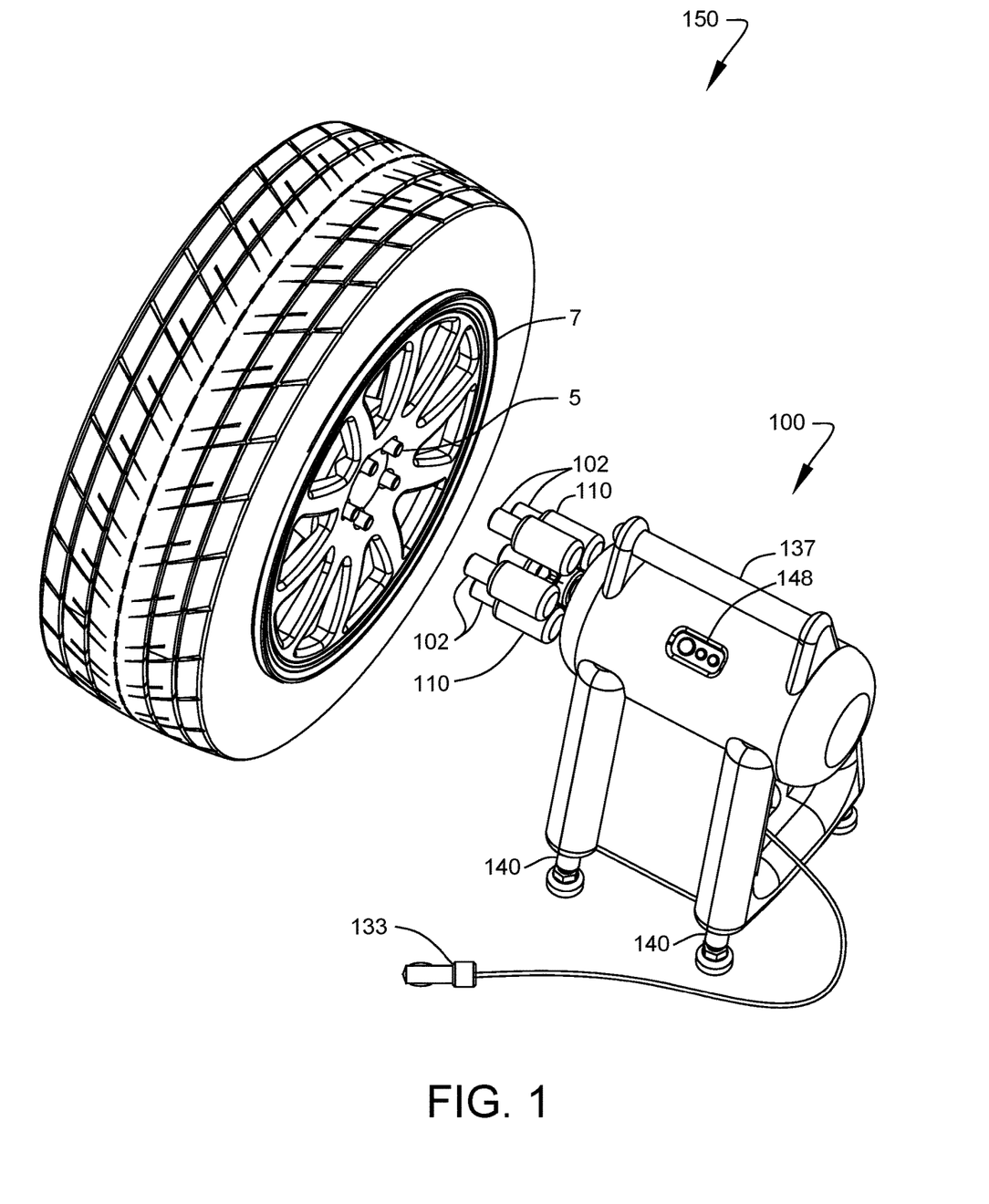
FIG. 1 is a rear perspective view of the portable roadside assistant device during an 'in-use' condition, according to an embodiment of the disclosure.
Figure 2:
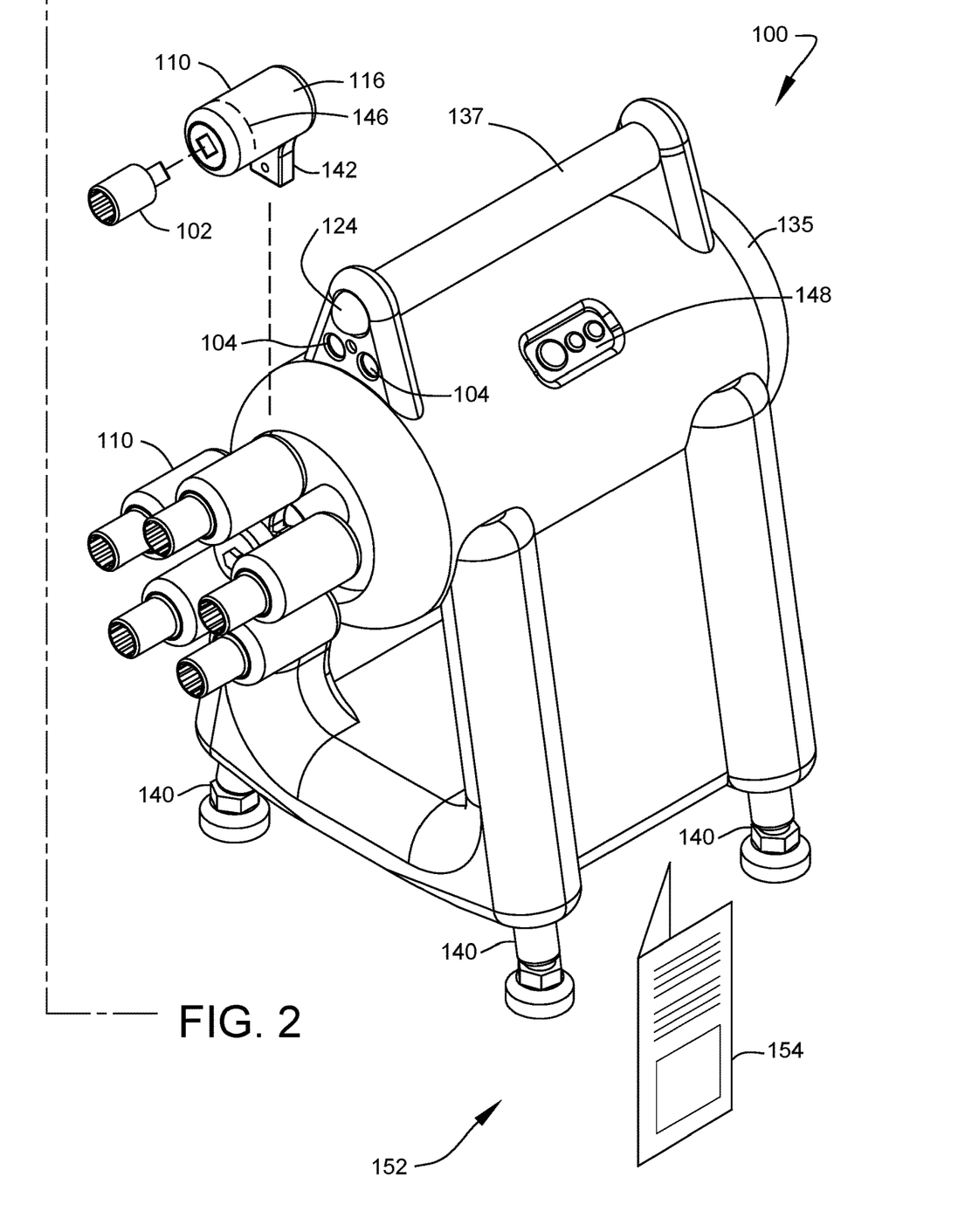
FIG. 2 is a front perspective view of the portable roadside assistant device of FIG. 1, according to an embodiment of the present disclosure.
Figure 3:
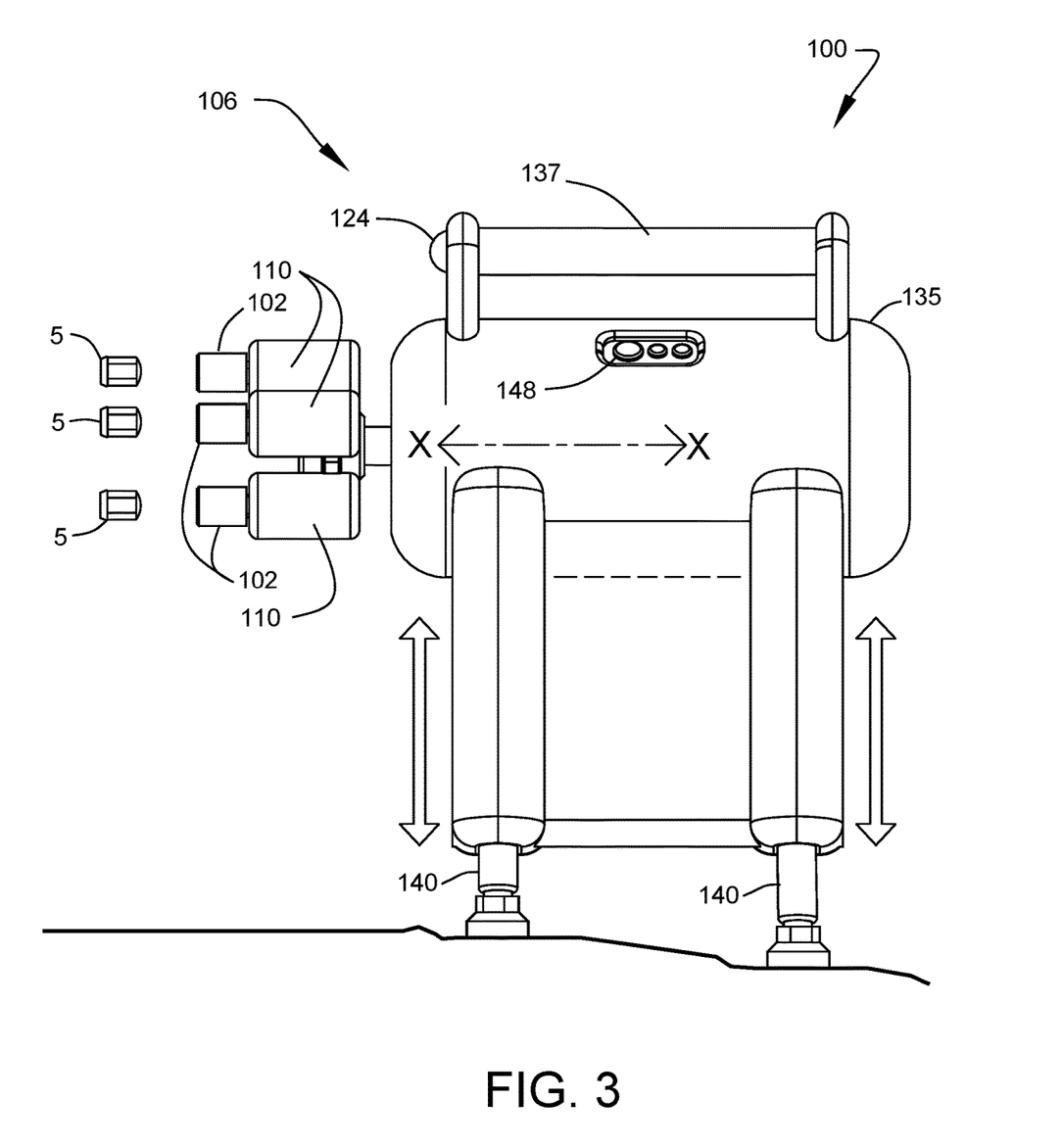
FIG. 3 is a side view of the portable roadside assistant device of FIG. 1, according to an embodiment of the present disclosure.
Figure 4:
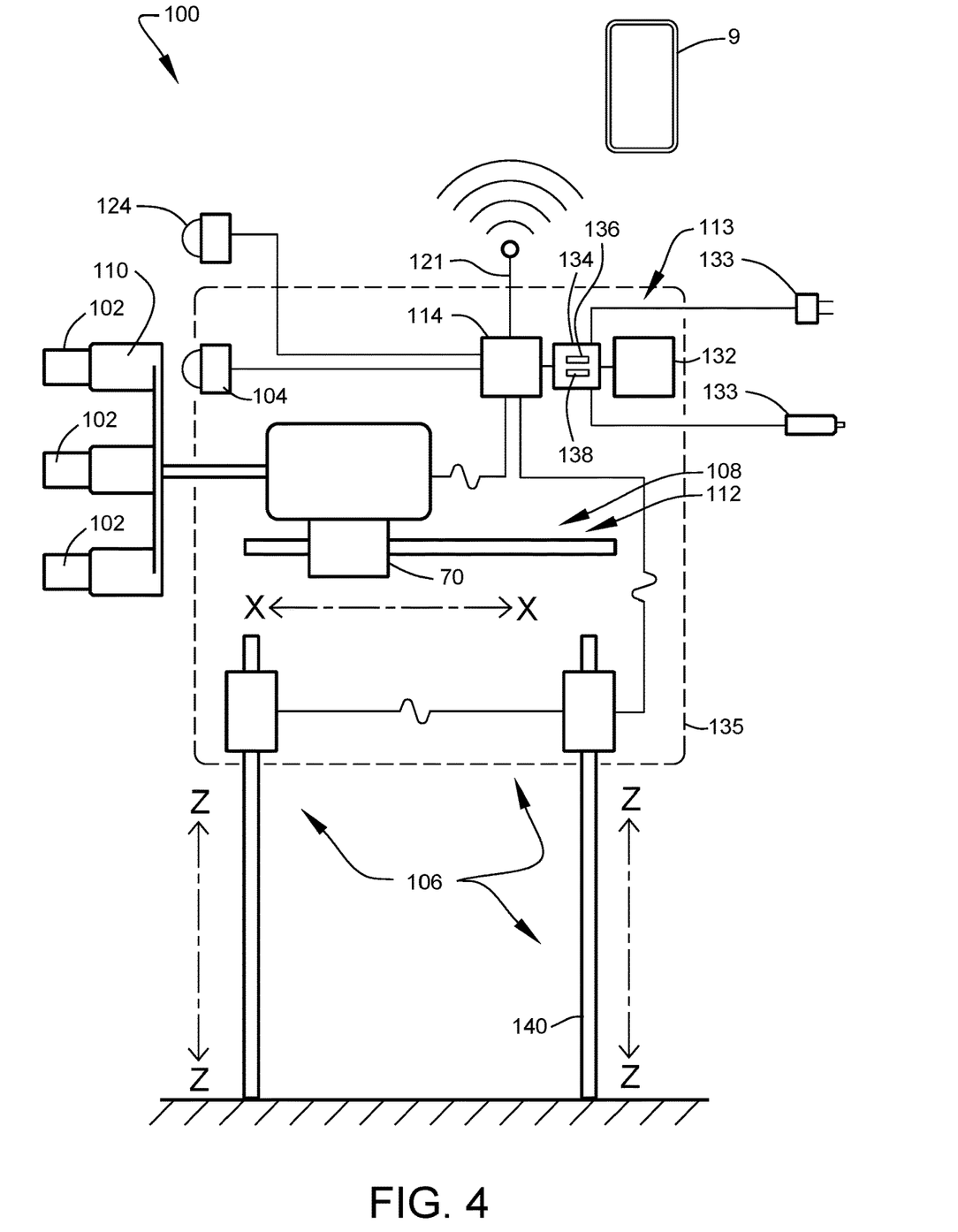
FIG. 4 is schematic diagram illustrating features of the portable roadside assistant device of FIG. 1, according to an embodiment of the present disclosure.

Referring now more specifically to the drawings by numerals of reference, there is shown in FIGS. 1-9, various views of a portable roadside assistant device 100. FIG. 1 shows a portable roadside assistant device 100 during an 'in-use' condition 150, according to an embodiment of the present disclosure. FIG. 2 is a front perspective view of the portable roadside assistant device 100 of FIG. 1. FIG. 3 is a side view of the portable roadside assistant device 100 of FIG. 1. FIG. 4 is a schematic diagram illustrating the operational features of the portable roadside assistant device 100 of FIG. 1, according to preferred embodiments of the present disclosure.

As illustrated, the portable roadside assistant device 100 assists the removal and installation of lug nuts 5 securing a vehicle wheel 7 to a vehicle. Such portable roadside assistant device 100 may include a plurality of sockets 102 configured to engage the lug nuts 5 during the removal and installation procedure, one or more sensors 104 configured to sense the locations of the lug nuts 5 relative to the vehicle wheel 7, a socket-alignment mechanism 106 (see FIG. 4) configured to align the plurality of sockets 102 in operable positions with respect to the lug nuts 5, a socket-advancing mechanism 108 configured to advance the plurality of sockets 102 to positions of simultaneous engagement with the lug nuts 5, a motor-driven rotator 110 configured to simultaneously rotate the plurality of sockets 102 in clock-wise and counter-clockwise directions, and a socket-retracting mechanism 112 configured to retract the plurality of sockets 102 and the lug nuts 5 away from the wheel 7 of the vehicle (to permit removal and replacement of the vehicle wheel 7). An automatic controller 114 is provided to automatically control the operation of the sensor(s) 104, the socket-alignment mechanism 106, the socket-advancing mechanism 108, the motor-driven rotator(s) 110, and the socket-retracting mechanism 112.

An electrical power supply 113 is provided to power the sensor(s) 104, the socket-alignment mechanism 106, the socket-advancing mechanism 108, the motor-driven rotator 110, the socket-retracting mechanism 112, and the automatic controller 114. The power supply 113 may be implemented as an onboard battery 132, a cable-type connector 133 to allow a remote hook up of the device to an AC or DC power source, or a combination of both. One or more rechargeable-type batteries 132 may be provided if the onboard battery option is utilized. A charging unit 134 may be provided to recharge the rechargeable battery 132 and to control transfer of power to the system's subcomponent. The charging unit 134 may include a direct-current charging circuit 136 configured to charge the rechargeable battery 132 using a direct-current electrical power source and an alternating current charging circuit 138 configured to charge the rechargeable battery 132 using an alternating current electrical power source. In one arrangement of the present disclosure, the rechargeable battery 132 may use lithium-ion cells and the direct-current charging circuit 136 may consist of a constant-current/constant-voltage battery charge circuit. In this arrangement, the alternating current charging circuit 138 may include an AC to DC converter to convert the AC electrical power to DC electrical power usable by the direct-current charging circuit 136.

The automatic controller 114 may include a microprocessor and memory containing operational code configured to control the operation of the microprocessor. The operational code may utilize sensor data generated by one or more sensors 104 to identify the positions of the lug nuts 5. In one implementation of the present disclosure, the sensor 104 may be an image-capturing device using visible light to capture image data associated with the vehicle wheel 7. In another implementation, the sensor 104 may include a laser scanner configured to capture scanned data associated with the vehicle wheel 7. A laser may be projected onto the surfaces of the vehicle wheel 7 and viewed from different angles by moving the camera and laser-imaging system. A pair of imaging devices may be used to provide stereoscopic vision. Regardless of the selected sensor configuration, sensor data generated by the sensor 104 (or multiple sensors) is sent to the automatic controller 114 for processing and analysis. The operational code of the automatic controller 114 may extract information from the data relating to the identity, position, and orientation of the vehicle wheel 7 and lug nuts 5.

A portable housing 135 may be provided to house the power supply 113, the sensor(s) 104, the socket-alignment mechanism 106, the socket-advancing mechanism 108, the motor-driven rotator(s) 110, the socket-retracting mechanism 112, the automatic controller 114, and related subcomponents of the device. The housing 135 may be an aerodynamic aluminum case that is lightweight and approximately 12 inches in height.

Figure 5:
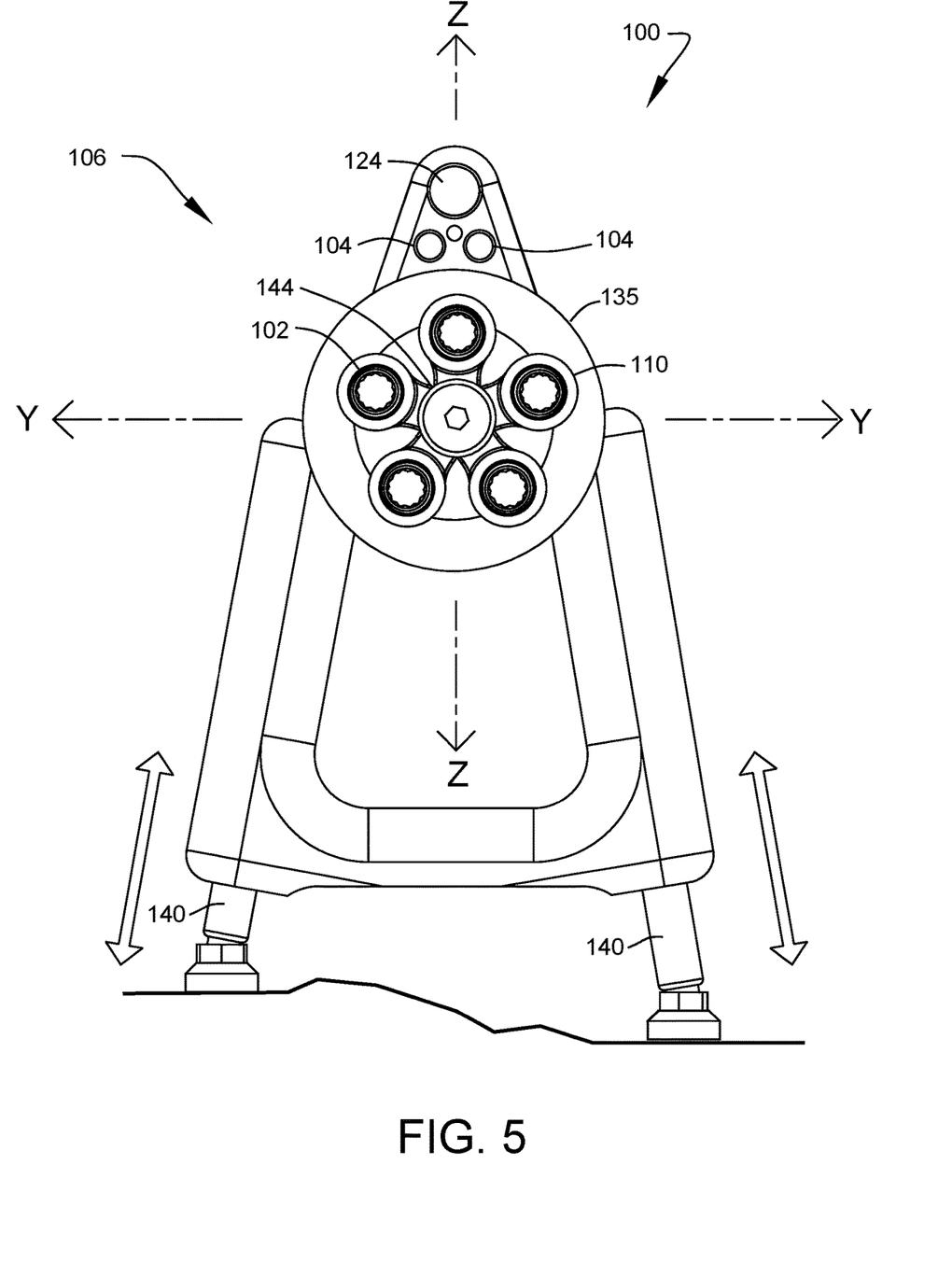
FIG. 5 is a front view of the portable roadside assistant device of FIG. 1, according to an embodiment of the present disclosure.

FIG. 5 is a front view of the portable roadside assistant device 100 of FIG. 1, according to an embodiment of the present disclosure. In reference to FIG. 1 through FIG. 5, the portable roadside assistant device 100 may include a set of legs 140, as shown. In one arrangement of the present disclosure, the length of the legs 140 may be mechanically adjusted by the automatic controller 114 to lift, lower, and level the unit. This allows the unit to be self-stabilized over uneven ground. Moreover, the self-adjusting legs 140 may form a part of the socket-alignment mechanism 106 wherein active adjustment to the length of the legs may be utilized to properly align the sockets 102 with the lug nuts 5. In one arrangement of the present disclosure, the length of each of the leg 140 may be independently adjustable by the automatic controller 114. Thus, the leg-based portion of the socket-alignment mechanism 106 is capable of adjusting the positions of the sockets 102 generally along at least two independent axes including the vertical Z axis and transversely along the Y axis, as best shown in FIG. 5. Those with ordinary skill in the art will now appreciate that upon reading this specification and by their understanding the art of mechanical actuation systems as described herein, methods of mechanically-adjusting the length of the legs by automatic control will be understood by those knowledgeable in such art.

Operation of the socket-advancing mechanism 108 and the socket-retracting mechanism 112 may be enabled by a single linear actuator 70 configured to advance and retract the sockets 102 along the X axis, as indicated by the horizontal arrow depiction. In addition, the sockets 102 may be configured to rotate about the X axis by an additional actuator. This feature allows the sockets to be rotationally aligned to match the position of the lug nuts 5.

In one version of the present disclosure, the motor-driven rotator 110 may include a set of motors 116 mounted individually on adjustable arms 142, as shown. In this arrangement, each adjustable arm 142 includes a single dedicated motor 116 driving one socket 102, as shown. The individual motors 116 may consist of a compact high-torque DC brush motor driving the socket through a reduction gearbox. The drive assembly may include an impact-wrench feature to impose a series of intermittent or impact-torque impulses through, for example, a rotary hammer impacting an anvil element, which may be integral with the drive assembly.

The drive assembly may further include a torque limiter 146 configured to limit the torque force applied to the lug nuts 5 by the sockets 102. The torque limiter 146 may be implemented by mechanical means or may be limited by the monitoring of electrical current draw by the automatic controller 114. Those with ordinary skill in the art will now appreciate that upon reading this specification and by their understanding of the art of mechanical and electrical torque control as described herein, methods of limiting applied torque to a predetermined level will be understood by those knowledgeable in such art.

Figure 6:
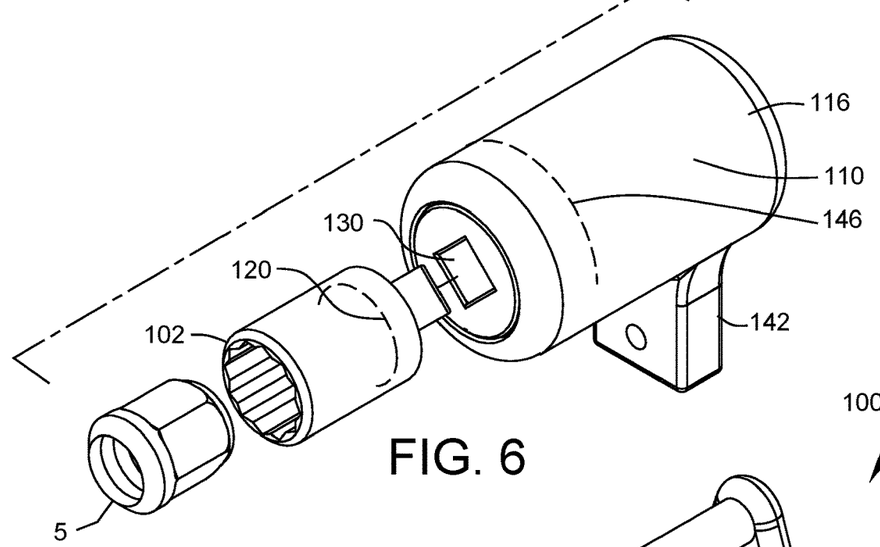
FIG. 6 is a front perspective view of a removable driver of the portable roadside assistant device of FIG. 1, according to an embodiment of the present disclosure.
Figure 7:
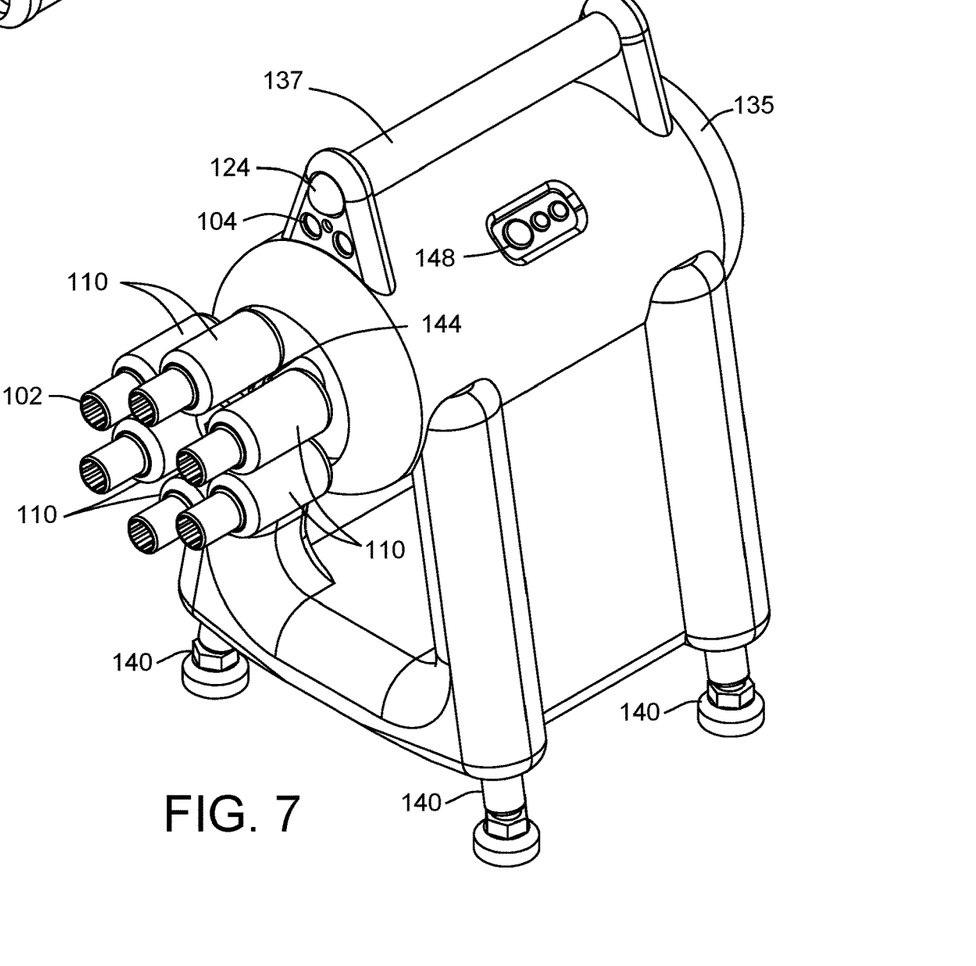
FIG. 7 is a front perspective view of an alternate configuration of the roadside assistant device of FIG. 1, according to an embodiment of the present disclosure.

FIG. 6 is a front perspective view of a removable driver of the portable roadside assistant device 100 of FIG. 1, according to an embodiment of the present disclosure. FIG. 7 is a front perspective view of an alternate configuration of the roadside assistant device 100 of FIG. 1, according to an embodiment of the present disclosure. Each socket 102 may be sized to match the lug nuts 5. Inclusion of a socket receiver 130 in each arm allows the sockets to be interchanged, as required to accommodate a particular vehicle or wheel configuration. More preferably, the sockets 102 may be of a "universal" type capable of operably-engaging lug nuts of differing sizes. A typical example of such "universal" sockets carry a plurality of pins, which are movable inwards against individual spring biasing so that the head of the lug nut, after the socket is pushed onto it, is firmly engaged by the surrounding pins. One such universal socket is sold under the brand name GATOR GRIP® and operation of a similar socket is described in greater detail in, for example, U.S. Pat. No. 5,622,090 to Marks, incorporated herein by reference for further examples of implementation engineering.

Each socket 102 may further include a lug-nut retainer 120 configured to retain the lug nuts 5 within the sockets 102 after removal. The lug-nut retainer 120 may consist of a permanent magnet located at the back of the socket.

The arms 142 may be mounted to a central hub 144 (see also FIG. 5) configured to locate the arms and sockets in an arrangement matching the quantity and spacing of the lug nuts 5. The central hub 144 may have a "universal" mounting feature to allow arms to be added, removed, and placed in one or more arrangements matching common lug-nut configurations. For example, the roadside assistant device 100 of FIG. 1 is configured to service a wheel having five lug nuts 5; an additional motor-driven rotator 110 has been added to the roadside assistant device 100 of FIG. 7 allowing the device to service a wheel with six five lug nuts 5. Thus, the size and the quantity of sockets 102 are user selectable to match the configuration of the vehicle wheel 7, as shown. The central hub 144 may include electrically-conductive couplings enabling the establishing of an electrically-conductive pathway between the controlled power source and the motor 116.

Figure 8:
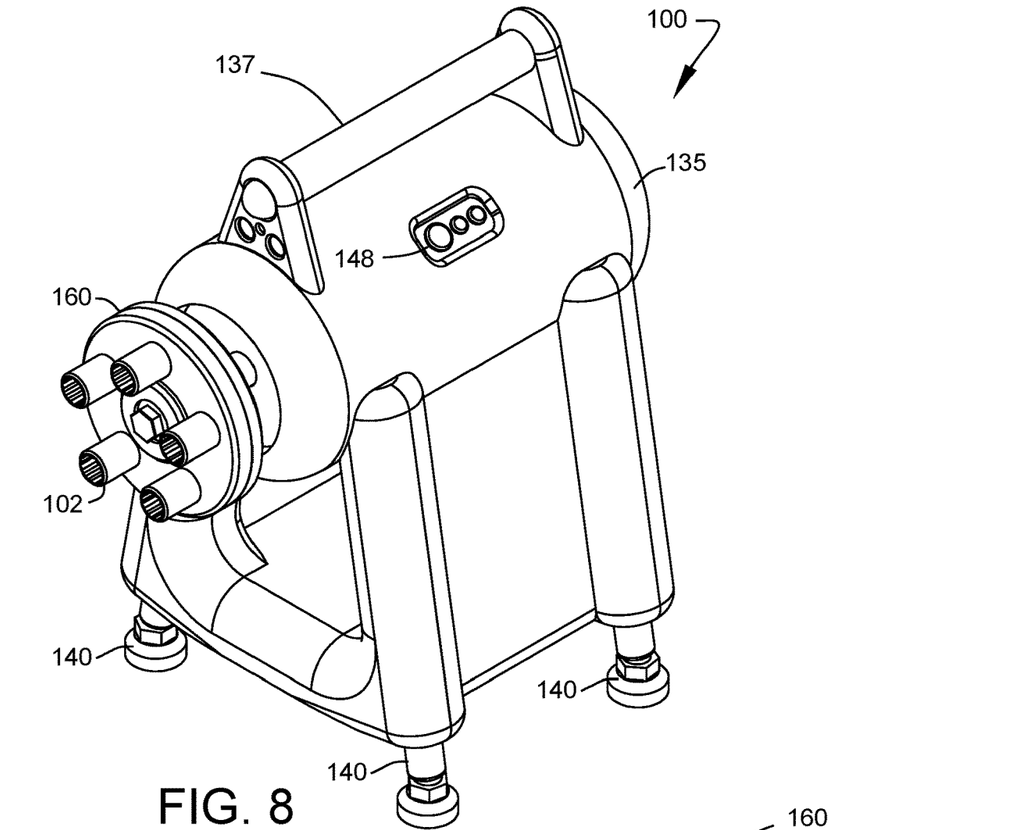
FIG. 8 is a front perspective view of an alternate portable roadside assistant device, according to an alternate embodiment of the present disclosure.
Figure 9:
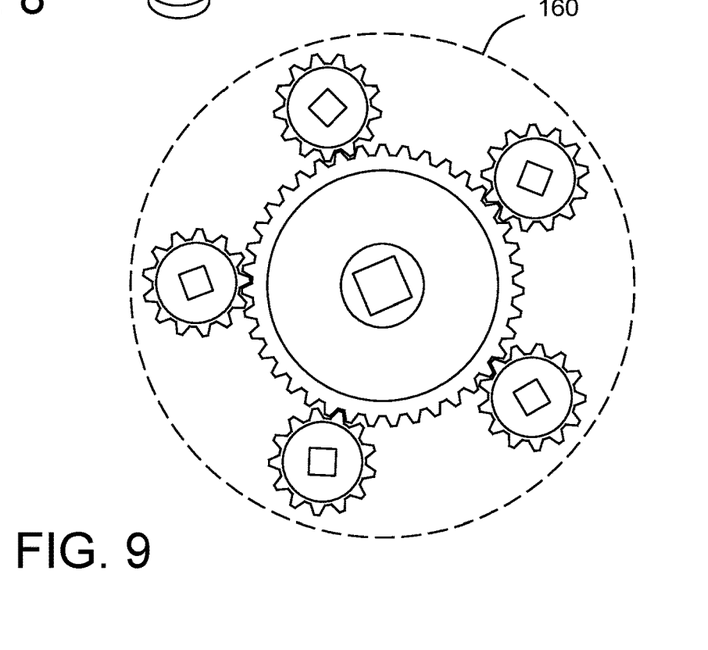
FIG. 9 is a diagrammatic front view of the alternate portable roadside assistant device of FIG. 8, according to an alternate embodiment of the present disclosure.

FIG. 8 is a front perspective view of an alternate portable roadside assistant device 100, according to an alternate embodiment of the present disclosure. FIG. 9 is a diagrammatic front view of the alternate portable roadside assistant device 100 of FIG. 8, according to an alternate embodiment of the present disclosure. In the alternate configuration of FIG. 8 and FIG. 9, the motor-driven rotator 110 may include a single motor operably coupled to the sockets 102 by a planetary gear train 160, as shown. It is noted that the configuration and operation of such a planetary gear train, without robotic control, is described in greater detail in, for example, U.S. Pat/Pub. No. 2002/0117027 to Boston, incorporated herein by reference for further examples of implementation engineering.

During use, a user may use a hand grip 137 located on the housing 135 to manually transport the portable roadside assistant device 100 to a position near the wheel 7 of the vehicle, as shown in FIG. 1. A push-button activator switch 148 located on the housing 135 may be used to initiate the automatic robotic features of the system. Alternately, the automatic robotic features of the system may be started wirelessly using a wireless connection 121 to a mobile device 9 running a control application. Those with ordinary skill in the art will now appreciate that upon reading this specification and by their understanding of the art of wireless data communication as described herein, methods of implementing wireless control using a personal mobile device, such as a smart phone, will be understood by those knowledgeable in such art.

On initiation, the automatic controller 114 may first initiate operation of the sensor(s) 104 to generate sensor data and identify the configuration of the lug nuts 5. Once identified, the automatic controller 114 may execute the required sequence of operations required to remove and replace the lug nuts 5. This sequence may include:

1) Automatically aligning the plurality of sockets 102 to operable positions with respect to the lug nuts 5.
2) Automatically advancing the sockets 102 to positions of engagement with the lug nuts 5.
3) Simultaneously rotating the plurality of sockets 102 in a removal direction using the motor-driven rotator 110.
4) Automatically retracting the plurality of sockets 102 and the lug nuts 5 away from the vehicle wheel 7 to permit removal and replacement of the vehicle wheel 7.
5) Automatically advancing the plurality of sockets 102 and the lug nuts 5 toward the vehicle wheel 7 to permit reinstallation of the lug nuts 5 on the vehicle wheel 7.
6) Simultaneously rotating the plurality of sockets 102 in an installation direction using the motor-driven rotator 110.
7) Automatically retracting the plurality of sockets 102 away from the lug nuts 5 after installation of the lug nuts 5.

Upon reading this specification, it should be appreciated that, under appropriate circumstances, considering such issues as user preferences, design preference, marketing preferences, cost, available materials, technological advances, etc., other device arrangements such as, for example, utilizing alternate sensor technology, generating a user alert if the alignment of the sockets with the lug nuts cannot be achieved without repositioning of the housing, providing other articulated "robotic" arm arrangements, etc., may be sufficient.

The portable roadside assistant device 100 may include additional safety features, such as an electrically-operated light 124 configured to illuminate the vehicle wheel 7 during use. Upon reading this specification, it should be appreciated that, under appropriate circumstances, considering such issues as user preferences, design preference, marketing preferences, cost, available materials, technological advances, etc., other device arrangements such as, for example, generating a user alert indicting low battery charge, including one or more wheels to the housing to assist transport, providing a storage compartment to hold sockets and tools, providing a storage bag or case, providing a self-driving/self-locating wheel assembly, etc., may be sufficient.

Referring again to FIG. 3, the portable roadside assistant device 100 may be arranged as a kit 152. The kit 152 may include a set of instructions 154. The instructions may detail functional relationships in relation to the structure of the portable roadside assistant device 100 (such that the portable roadside assistant device 100 can be used, maintained, or the like, in a preferred manner).

Figure 10:
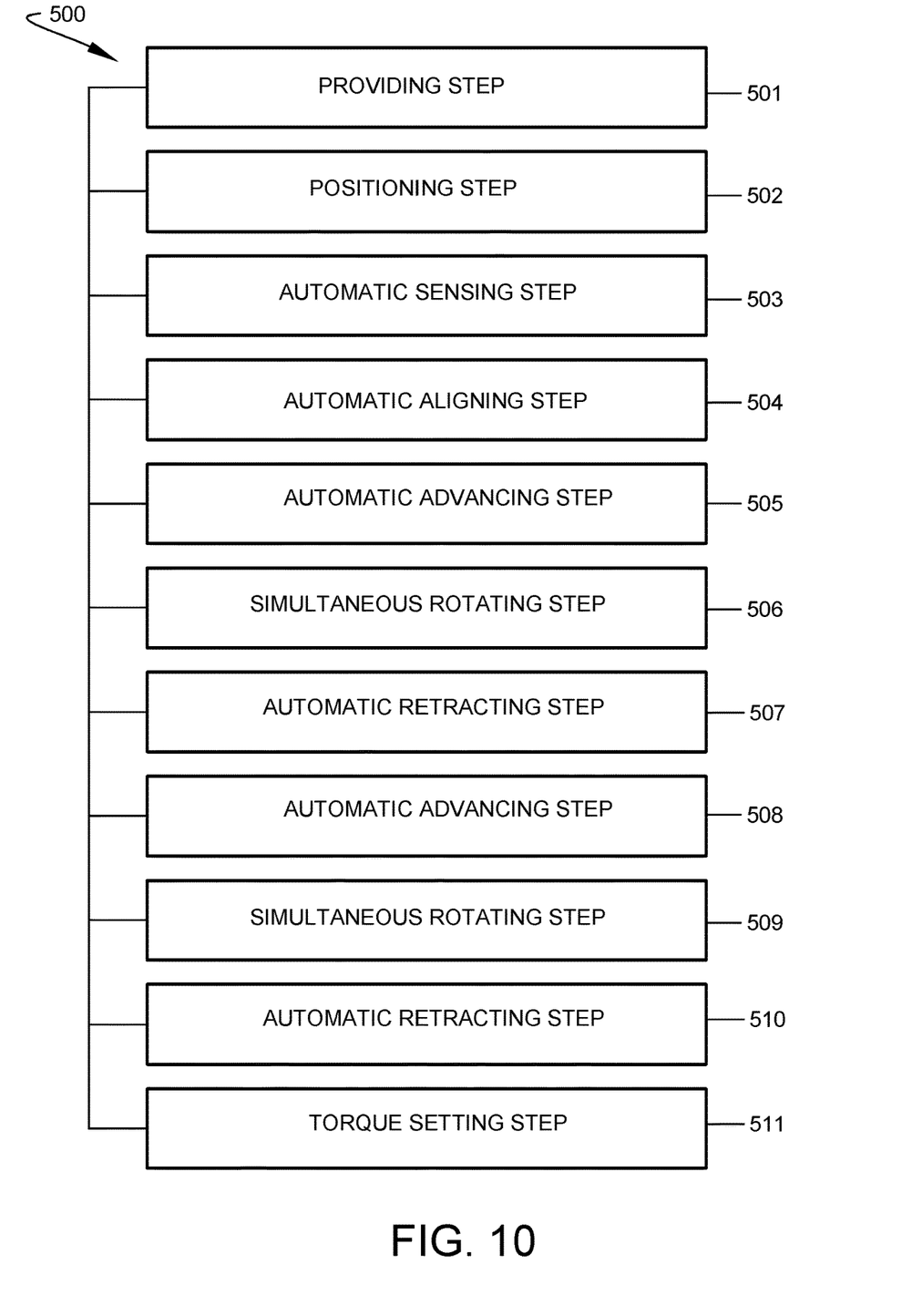
FIG. 10 is a flow diagram illustrating a method of use for portable roadside assistant device, according to an embodiment of the present disclosure.

FIG. 10 is a flow diagram illustrating a method 500 of using a portable roadside assistant device 100, according to an embodiment of the present disclosure. As illustrated, the method 500 may include the steps of: step one 501, providing a portable roadside assistant device 100 comprising a sensor 104 configured to sense the locations of the lug nuts 5 relative to the vehicle wheel 7, a socket-alignment mechanism 106 configured to align the plurality of sockets 102 in operable positions with respect to the lug nuts 5, a socket-advancing mechanism 108 configured to advance the plurality of sockets 102 to positions of simultaneous engagement with the lug nuts 5, a motor-driven rotator 110 configured to simultaneously rotate the plurality of sockets 102 in clock-wise and counter-clockwise directions, a socket-retracting mechanism 112 configured to retract the plurality of sockets 102 and the lug nuts 5 away from the vehicle wheel 7 to permit removal and replacement of the vehicle wheel 9, an automatic controller 114 configured to automatically control the operation of the sensor 104, the socket-alignment mechanism 106, the socket-advancing mechanism 108, the motor-driven rotator 110, and the socket-retracting mechanism 112, a power supply 113 adapted to power the sensor 104, the socket-alignment mechanism 106, the socket-advancing mechanism 108, the motor-driven rotator 110, the socket-retracting mechanism 112, and the automatic controller 114, and a portable housing adapted to portably house the onboard power supply 113, the sensor 104, the socket-alignment mechanism 106, the socket-advancing mechanism 108, the motor-driven rotator 110, the socket-retracting mechanism 112, and the automatic controller 114; step two 502, positioning the portable roadside assistant device 100 adjacent to the vehicle wheel 7; step three 503, automatically sensing the locations of the lug nuts 5 relative to the vehicle wheel 7; step four 504, automatically aligning a plurality of sockets 102 in operable positions with respect to the lug nuts 5; step five 505, advancing the plurality of sockets 102 to positions of engagement with the lug nuts 5; step six 506, simultaneously rotating the plurality of sockets 102 in a removal direction using a motor-driven rotator 110; step seven 507, automatically retracting the plurality of sockets 102 and the lug nuts 5 away from the vehicle wheel 7 to permit removal and replacement of the vehicle wheel 7; step eight 508, automatically advancing the plurality of sockets 102 and the lug nuts 5 toward the vehicle wheel 7 to permit reinstallation of the lug nuts 5 on the vehicle wheel 7; step nine 509, simultaneously rotating the plurality of sockets 102 in an installation direction using the motor-driven rotator 110; and step ten 510, automatically retracting the plurality of sockets 102 away from the lug nuts 5 after installation. Even further, it provides such a method, further comprising the step eleven 511, of setting a torque force applied to the lug nuts 5 by the plurality of sockets 102 to a pre-determined limit.

It should be noted that step 511 is an optional step and may not be implemented in all cases. Optional steps of method 500 are illustrated using dotted lines in FIG. 10 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for portable roadside assistant device 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable roadside assistant device for assisting removal and installation of lug nuts securing a vehicle wheel to a vehicle, said portable roadside assistant device comprising:
    a plurality of sockets configured to engage the lug nuts during the removal and installation;
    a sensor configured to sense the locations of the lug nuts relative to the vehicle wheel;
    a socket aligner configured to align the plurality of sockets in operable positions with respect to the lug nuts;
    a socket advancer configured to advance the plurality of sockets to positions of simultaneous engagement with the lug nuts;
    a motor-driven rotator configured to simultaneously rotate the plurality of sockets in clockwise and counter-clockwise directions;
    a socket retractor configured to retract the plurality of sockets and the lug nuts away from the vehicle wheel to permit removal and replacement of the vehicle wheel;
    an automatic controller configured to automatically control the operation of the sensor, the socket aligner, the socket advancer, the motor-driven rotator, and the socket retractor;
    an onboard power supply adapted to power the sensor, the socket aligner, the socket advancer, the motor-driven rotator, the socket retractor, and the automatic controller; and
    a portable housing adapted to portably house the onboard power supply, the sensor, the socket aligner, the socket advancer, the motor-driven rotator, the socket retractor, and the automatic controller.

2. The portable roadside assistant device of claim 1, wherein the motor-driven rotator comprises a plurality of motors, each motor rotating a respective one of the sockets.

3. The portable roadside assistant device of claim 1, wherein the motor-driven rotator comprises a single motor operably coupled to the sockets by a planetary gear train.

4. The portable roadside assistant device of claim 1, wherein the socket aligner is adapted to enable adjustment to the positions of the sockets along at least two independent axes.

5. The portable roadside assistant device of claim 1, further comprising a lug-nut retainer configured to retain the lug nuts within the sockets after removal.

6. The portable roadside assistant device of claim 5, wherein the lug-nut retainer comprises a magnet.

7. The portable roadside assistant device of claim 1, further comprising a torque limiter configured to limit the torque force applied to the lug nuts by the plurality of sockets.

8. The portable roadside assistant device of claim 1, further comprising an electrically-operated light configured to illuminate the vehicle wheel.

9. The portable roadside assistant device of claim 1, wherein the sensor comprises an image-capturing device configured to capture image data associated with the vehicle wheel usable by the automatic controller.

10. The portable roadside assistant device of claim 1, wherein the sensor comprises a laser scanner configured to capture scanned data associated with the vehicle wheel usable by the automatic controller.

11. The portable roadside assistant device of claim 1, wherein the wherein the onboard power supply comprises a rechargeable battery.

12. The portable roadside assistant device of claim 11, further comprising a charging unit adapted to recharge the rechargeable battery, the charging unit including
    a direct-current charging circuit configured to charge the rechargeable battery using a direct-current electrical power source, and
    an alternating current charging circuit configured to charge the rechargeable battery using an alternating current electrical power source.

13. The portable roadside assistant device of claim 1, wherein the automatic controller comprises a microprocessor and memory containing operational code configured to control the operation of the microprocessor.

14. The portable roadside assistant device of claim 1, wherein the housing comprises a hand grip adapted to assist manual transport of the portable roadside assistant device.

15. The portable roadside assistant device of claim 1, further comprising a socket receiver adapted to removably receive the plurality of sockets.

16. The portable roadside assistant device of claim 15, wherein a size and a quantity of the plurality of sockets are user selectable to match a configuration of the vehicle wheel.

17. A portable roadside assistant device for assisting removal and installation of lug nuts securing a vehicle wheel to a vehicle, said portable roadside assistant device comprising:
    a plurality of universal sockets configured to engage the lug nuts during the removal and installation;
    a sensor configured to sense the locations of the lug nuts relative to the vehicle wheel;
    a socket aligner configured to align the plurality of universal sockets in operable positions with respect to the lug nuts;
    a socket advancer configured to advance the plurality of universal sockets to positions of simultaneous engagement with the lug nuts;
    a motor-driven rotator configured to simultaneously rotate the plurality of universal sockets in clockwise and counter-clockwise directions;
    a socket retractor configured to retract the plurality of universal sockets and the lug nuts away from the vehicle wheel to permit removal and replacement of the vehicle wheel;
    an automatic controller configured to automatically control the operation of the sensor, the socket aligner, the socket advancer, the motor-driven rotator, and the socket retractor;
    an onboard power supply adapted to power the sensor, the socket aligner, the socket advancer, the motor-driven rotator, the socket retractor, and the automatic controller;
    a portable housing adapted to portably house the onboard power supply, the sensor, the socket aligner, the socket advancer, the motor-driven rotator, the socket retractor, and the automatic controller;
    a lug-nut retainer configured to retain the lug nuts within the universal sockets after removal;
    a torque limiter configured to limit the torque force applied to the lug nuts by the plurality of universal sockets;
    a socket receiver adapted to removably receive the plurality of universal sockets;
    a charging unit adapted to recharge the rechargeable battery, the charging unit including
    a direct-current charging circuit configured to charge the rechargeable battery using a direct-current electrical power source, and
    an alternating current charging circuit configured to charge the rechargeable battery using an alternating current electrical power source; and
    an electrically-operated light configured to illuminate the vehicle wheel;
    wherein the socket aligner is adapted to enable adjustment to the positions of the universal sockets along at least two independent axes;
    wherein the lug-nut retainer comprises a magnet;
    wherein the sensor comprises an image-capturing device configured to capture image data associated with the vehicle wheel usable by the automatic controller;
    wherein the wherein the onboard power supply comprises a rechargeable battery;
    wherein the automatic controller comprises a microprocessor and memory containing operational code configured to control the operation of the microprocessor;
    wherein the housing comprises a hand grip adapted to assist manual transport of the portable roadside assistant device; and
    wherein a size and a quantity of the plurality of universal sockets are user selectable to match a configuration of the vehicle wheel.

18. The portable roadside assistant device of claim 17, further comprising set of instructions; and
    wherein the portable roadside assistant device is arranged as a kit.

19. A method of using a portable roadside assistant device to assist removal and installation of lug nuts securing a vehicle wheel to a vehicle, the method comprising the steps of:
    providing the portable roadside assistant device comprising:
    a plurality of sockets configured to engage the lug nuts during the removal and installation;
    a sensor configured to sense the locations of the lug nuts relative to the vehicle wheel;
    a socket aligner configured to align the plurality of sockets in operable positions with respect to the lug nuts;
    a socket advancer configured to advance the plurality of sockets to positions of simultaneous engagement with the lug nuts;
    a motor-driven rotator configured to simultaneously rotate the plurality of sockets in clockwise and counter-clockwise directions;
    a socket retractor configured to retract the plurality of sockets and the lug nuts away from the vehicle wheel to permit removal and replacement of the vehicle wheel;

an automatic controller configured to automatically control the operation of the sensor, the socket aligner, the socket advancer, the motor-driven rotator, and the socket retractor;

an onboard power supply adapted to power the sensor, the socket aligner, the socket advancer, the motor-driven rotator, the socket retractor, and the automatic controller; and a portable housing adapted to portably house the onboard power supply, the sensor, the socket aligner, the socket advancer, the motor-driven rotator, the socket retractor, and the automatic controller;

positioning the portable roadside assistant device adjacent to the vehicle wheel;

automatically sensing the locations of the lug nuts relative to the vehicle wheel;

automatically aligning the plurality of sockets to operable positions with respect to the lug nuts;

automatically advancing the plurality of sockets to positions of engagement with the lug nuts;

simultaneously rotating the plurality of sockets in a removal direction using a motor-driven rotator;

automatically retracting the plurality of sockets and the lug nuts away from the vehicle wheel to permit removal and replacement of the vehicle wheel;

automatically advancing the plurality of sockets and the lug nuts toward the vehicle wheel to permit reinstallation of the lug nuts on the vehicle wheel;

simultaneously rotating the plurality of sockets in an installation direction using the motor-driven rotator; and automatically retracting the plurality of sockets away from the lug nuts after installation.

20. The method of claim 19, further comprising the step of setting a torque force applied to the lug nuts by the plurality of sockets to a pre-determined limit.

\* \* \* \* \*